US012797647B2

(12) United States Patent
Danner et al.

(10) Patent No.: US 12,797,647 B2
(45) Date of Patent: Nov. 17, 2026

(54) PRESSURE REDUCER AND SELF-CONTAINED BREATHING APPARATUS

(71) Applicant: SCOTT TECHNOLOGIES, INC., St. Paul, MN (US)

(72) Inventors: Christopher M. Danner, Matthews, NC (US); Darrill L. Plummer, Midland, NC (US); William E. Parson, Indian Trail, NC (US); Elliott C. Miller, Monroe, NC (US)

(73) Assignee: SCOTT TECHNOLOGIES, INC., Monroe, NC (US)

( * ) Notice: Subject to any disclaimer, the term of this patent is extended or adjusted under 35 U.S.C. 154(b) by 1018 days.

(21) Appl. No.: 17/937,852

(22) Filed: Oct. 4, 2022

(65) Prior Publication Data

US 2023/0116265 A1 Apr. 13, 2023

Related U.S. Application Data

(60) Provisional application No. 63/262,265, filed on Oct. 8, 2021.

(51) Int. Cl.

*A62B 9/02* (2006.01)
*B63C 11/22* (2006.01)
*G05D 16/00* (2006.01)

(52) U.S. Cl.

CPC ............ *A62B 9/02* (2013.01); *B63C 11/2209* (2013.01); *G05D 16/00* (2013.01)

(58) Field of Classification Search

CPC .... A62B 7/00; A62B 7/02; A62B 9/00; A62B 9/02; A62B 9/022; A62B 18/00; B63C 11/18; B63C 11/22; B63C 11/2209; B63C 2011/2218; G05D 16/00

See application file for complete search history.

(56) References Cited

U.S. PATENT DOCUMENTS 5,331,955 A * 7/1994 Lewis ................. B63C 11/2209 128/201.27
5,379,761 A * 1/1995 Schuler .............. G05D 16/0402 128/205.24

(Continued)

OTHER PUBLICATIONS

3M Scott Air-Pak 75i, 4 pages.

*Primary Examiner* — Colin W Stuart
(74) *Attorney, Agent, or Firm* — Weisberg I.P. Law, P.A.

(57) ABSTRACT

A pressure reducer for a self-contained breathing apparatus (SCBA) is provided. The pressure reducer includes a body including an outer surface. The pressure reducer further includes a valve unit configured to receive a breathable gas from a high-pressure tank at a tank pressure and to deliver the breathable gas at an outlet pressure lower than the tank pressure. The pressure reducer further includes a plurality of vent holes extending from the outer surface. The plurality of vent holes is configured to vent a gas from an interior of the body. The pressure reducer further includes a cover removably disposed on the outer surface and enclosing the plurality of vent holes. The cover includes a fluid passage disposed in fluid communication with the plurality of vent holes. The fluid passage is configured to receive the gas from the plurality of vent holes and discharge the gas externally of the cover.

14 Claims, 6 Drawing Sheets

(56) References Cited

U.S. PATENT DOCUMENTS

| | | | | | |
|---|---|---|---|---|---|
| 5,655,524 | A * | 8/1997 | Atkins | A62B 9/02 | 128/205.24 |
| 5,678,542 | A * | 10/1997 | Maffatone | B63C 11/32 | 128/201.27 |
| 6,091,331 | A * | 7/2000 | Toft | G08B 25/10 | 340/532 |
| 7,191,790 | B1 | 3/2007 | Mele | | |
| 7,647,927 | B2 * | 1/2010 | Teetzel | A62B 7/10 | 55/467 |
| 7,658,190 | B1 | 2/2010 | Phifer et al. | | |
| 7,748,380 | B1 | 7/2010 | Phifer et al. | | |
| 2010/0139661 | A1 | 6/2010 | Landis | | |
| 2015/0283409 | A1 * | 10/2015 | Buck | A62B 9/02 | 128/204.22 |
| 2016/0377188 | A1 * | 12/2016 | Messner | F16K 11/085 | 137/1 |

* cited by examiner

PRESSURE REDUCER AND SELF-CONTAINED BREATHING APPARATUS

CROSS REFERENCE TO RELATED APPLICATION

This application claims priority from U.S. Provisional Application Ser. No. 63/262,265, filed Oct. 8, 2021, the disclosure of which is incorporated by reference in its/their entirety herein.

TECHNICAL FIELD

The present disclosure relates to the field of personal protective equipment, such as a self-contained breathing apparatus. More specifically, the present disclosure relates to a pressure reducer for the self-contained breathing apparatus.

BACKGROUND

Personal protective equipment (PPE), such as a self-contained breathing apparatus (SCBA), typically includes a breathing gas stored under high-pressure in a storage tank and administered to a user of the PPE through one or more pressure reducers. The pressure reducer may receive the breathing gas from the storage tank at high-pressure and may reduce the pressure of the breathing gas to an intermediate pressure. The pressure reducer may typically include one or more vent holes disposed on a body of the pressure reducer. The vent holes may allow a gas (e.g., air leakage) to be vented from an inside of the body.

Such PPEs are cleaned from time to time during a service life of the PPE. Further, washing machines have been developed that are specifically used to clean the PPEs. During washing or otherwise general operation of the PPE, the one or more vent holes on the body of the pressure reducer may be exposed to environmental elements, such as debris, water, etc. Such environmental elements may cause clogging of the vent holes and may interfere with the general working of the pressure reducer.

SUMMARY

In one aspect, a pressure reducer for a self-contained breathing apparatus (SCBA) is described. The pressure reducer includes a body including an outer surface. The pressure reducer further includes a valve unit disposed within the body and configured to receive a breathable gas from a high-pressure tank at a tank pressure and to deliver the breathable gas at an outlet pressure lower than the tank pressure. The pressure reducer further includes a plurality of vent holes extending from the outer surface of the body. The plurality of vent holes is configured to vent a gas from an interior of the body. The pressure reducer further includes a cover removably disposed on the outer surface and enclosing the plurality of vent holes. The cover includes a fluid passage disposed in fluid communication with the plurality of vent holes. The fluid passage is configured to receive the gas from the plurality of vent holes and discharge the gas externally of the cover.

In another aspect, a self-contained breathing apparatus (SCBA) is described. The SCBA includes a high-pressure tank configured to store a breathable gas at a tank pressure. The SCBA further includes a facemask configured to be worn by a user. The facemask defines an interior region adjacent to the user's face when the facemask is donned by the user. The SCBA further includes a regulator mounted on the facemask. The SCBA further includes a pressure reducer fluidly coupled to the high-pressure tank and the regulator. The pressure reducer includes a body including an outer surface. The pressure reducer further includes a valve unit disposed within the body and configured to receive the breathable gas from the high-pressure tank at the tank pressure and to deliver the breathable gas to the regulator at an outlet pressure lower than the tank pressure. The regulator is configured to admit the breathable gas into the interior region of the facemask. The pressure reducer further includes a plurality of vent holes extending from the outer surface of the body. The plurality of vent holes is configured to vent a gas from an interior of the body. The pressure reducer further includes a cover removably disposed on the outer surface and enclosing the plurality of vent holes. The cover includes a fluid passage disposed in fluid communication with the plurality of vent holes. The fluid passage is configured to receive the gas from the plurality of vent holes and discharge the gas externally of the cover.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

According to aspects of this disclosure, a pressure reducer for a self-contained breathing apparatus (SCBA) includes a body including an outer surface. The pressure reducer further includes a valve unit disposed within the body and configured to receive a breathable gas from a high-pressure tank at a tank pressure and to deliver the breathable gas at an outlet pressure lower than the tank pressure. The pressure reducer further includes a plurality of vent holes extending from the outer surface of the body. The plurality of vent holes is configured to vent a gas from an interior of the body. The pressure reducer further includes a cover removably disposed on the outer surface and enclosing the plurality of vent holes. The cover includes a fluid passage disposed in fluid communication with the plurality of vent holes. The fluid passage is configured to receive the gas from the plurality of vent holes and discharge the gas externally of the cover.

The cover may enclose the plurality of vent holes extending from the outer surface of the body of the reducer. Thus, the cover may protect the plurality of vent holes from a variety of factors or elements in an environment, such as debris, water, etc., during cleaning of the SCBA and/or during general operation of the SCBA. In some cases, the fluid passage may be configured such that any environmental elements, such as moisture or dust particles, may be discharged externally from the fluid passage due to gravity. Therefore, the fluid passage may prevent such environmental elements, that may otherwise enter the pressure reducer, from reaching the vent holes.

Figure 1:
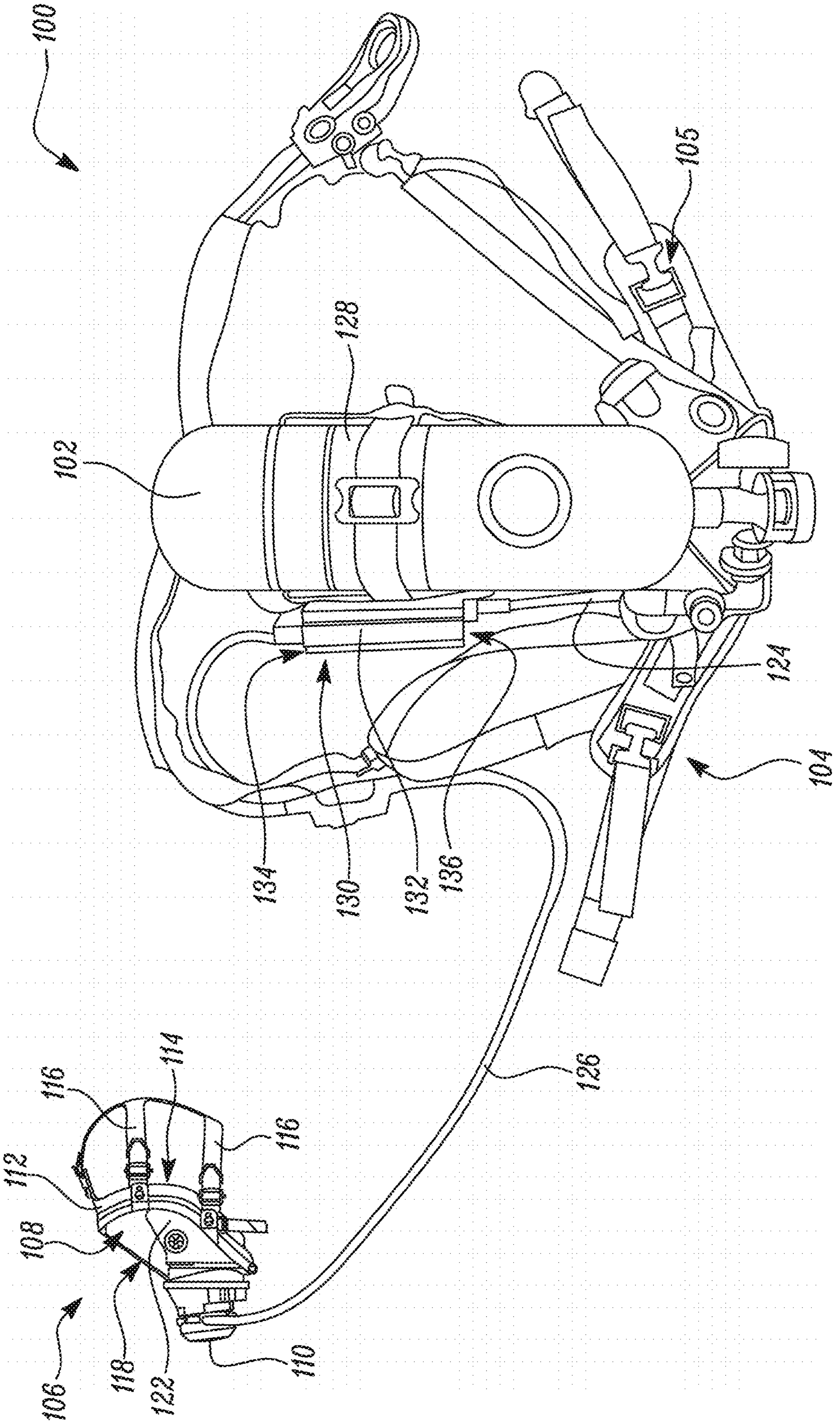
FIG. 1 illustrates a schematic view of an example of a self-contained breathing apparatus (SCBA), in accordance with techniques of this disclosure.

FIG. 1 illustrates a schematic view of an example of a self-contained breathing apparatus (SCBA) 100. The SCBA 100 is intended to be worn by a user (not shown) and arranged to deliver breathable air to the user of the SCBA 100. In some examples, the SCBA 100 may be used to protect the user from harm or injury from a variety of factors in an environment. For example, the SCBA 100 may be utilized by firefighters to protect against fires or extreme temperature conditions. In some examples, the SCBA 100 may be used by emergency personnel, e.g., law enforcement, medical personnel, first responders, healthcare professionals, paramedics, HAZMAT workers, security personnel, or other personnel who work in potentially hazardous environments, e.g., chemical, biological or nuclear environments, or other physical environments, e.g., construction sites, agricultural sites, mining or manufacturing sites. In some examples, the user may utilize the SCBA 100 while engaging in tasks or activities within the environment.

In some examples, the SCBA 100 may be a part of a personal protective equipment (PPE). The SCBA 100 may be used with other types of PPE. Examples of such PPE may include, but are not limited to, respiratory protection equipment (including disposable respirators, reusable respirators, powered air purifying respirators, and supplied air respirators), protective eyewear, such as visors, goggles, filters or shields (any of which may include augmented reality functionality), protective headwear, such as hard hats, hoods or helmets, hearing protection (including ear plugs and ear muffs), protective shoes, protective gloves, other protective clothing, such as coveralls and aprons, protective articles, such as sensors, safety tools, detectors, global positioning devices, mining cap lamps, fall protection harnesses, exoskeletons, self-retracting lifelines, heating and cooling systems, gas detectors, and any other suitable gear configured to protect the user from injury. As used herein, the term "protective equipment" may include any type of equipment or clothing that may be used to protect the user from hazardous or potentially hazardous conditions.

Although the SCBA 100 is described in the illustrated example of FIG. 1, the present disclosure is equally applicable to any other type of breathing apparatus. In some examples, the SCBA 100 may be a hybrid breathing system which may be selectively operable in an SCBA mode in which breathable air/gas may be provided by one or more tanks or cylinders, a PAPR mode of operation in which filtered ambient air may be drawn with the assistance of a blower through one or more air filters or purifiers and delivered to the user, and an APR mode of operation in which the air is drawn through one or more air filters or purifiers via a user's negative inhalation pressure.

The SCBA 100 includes a high-pressure tank 102 configured to store a breathable gas (or a gaseous mixture, most commonly compressed air) at a tank pressure P1 (which may be up to, e.g., 5500 psi). In the illustrated example of FIG. 1, only one high-pressure tank 102 is shown, however, the SCBA 100 may also include multiple high-pressure tanks 102. In some examples, the high-pressure tank 102 is secured to a backpack 104. In some examples, the SCBA 100 further includes a tank holder 128 configured to detachably receive the high-pressure tank 102. The backpack 104 may include various straps 105, buckles, and so on, by which the backpack 104 may be donned such that the high-pressure tank 102 may be comfortably supported, e.g., on the back of the user.

The SCBA 100 further includes a facemask 106 configured to be worn by the user of the SCBA 100. In some examples, the facemask 106 is intended to be worn on the head of the user. The facemask 106 defines an interior region 108 adjacent the user's face when the facemask 106 is donned by the user. In some examples, the facemask 106 includes a face blank 112 and a rear opening 114 which seals around the face of the user. In some examples, the face blank 112 may be made of a material (e.g., molded silicone or the like) that is selected to be substantially impermeable to airborne environmental hazards that the SCBA 100 may be designed to offer a barrier to and that ensures that the facemask 106 is fitted to the face of the user in a manner that minimizes or eliminates any air leaks.

In some examples, the face blank 112 may be designed to form a seal at its periphery with the face of the user. In some examples, the facemask 106 may cover substantially the entire face of the user. The face blank 112 further includes a series of cooperative straps 116 that are affixed to the facemask 106 to provide a means by which the user is able to forcibly bring the facemask 106 into contact with the face of the user to effect a seal therewith.

In some examples, the face blank 112 further includes a lens opening at an upper portion of the facemask 106. A transparent medium 118 is disposed in the lens opening through which the user may be able to see. In some examples, the transparent medium 118 may be configured to provide a substantially full field of view to the user. In some examples, the transparent medium 118 may be a substantially unitary piece of material (e.g., polycarbonate) having a curved contour. The transparent medium 118 may have an interior side that faces the user and defines the interior region 108 of the facemask 106 between the transparent medium 118 and the face of the user.

The SCBA 100 further includes a regulator 110 (also generally referred to as a second-stage regulator) mounted on the facemask 106. In the illustrated example of FIG. 1, the regulator 110 is mounted at a lower portion of the facemask 106. A nose cup 122 is disposed in the interior region 108 and fluidly connected to the regulator 110. The nose cup 122 may be configured to cover the nose and mouth of the user in a sealing manner. In other words, the nose cup 122 may fit snugly about the nose and mouth of the user to deliver breathable air thereto through the regulator 110. In the illustrated example of FIG. 1, the nose cup 122 serves as a fluid divider which separates an outside portion from an inside portion of the nose cup 122. As used herein, the term "outside portion" may refer to the interior region 108 of the facemask 106 between the transparent medium 118 and the face of the user. The term "inside portion" may refer to a space between the nose cup 122 and the face of the user. In some examples, the nose cup 122 may often be made of compliant materials in a similar manner as the face blank 112.

In some examples, the SCBA 100 may further include various other components, accessories, and so on (e.g., fittings to which voice amplifiers or radio direct interface devices may be attached, mask-mounted thermal imaging cameras, filtering components, etc.). For example, voice emitters may be mounted on the facemask 106 to amplify the voice of the user to facilitate communication with other individuals and help provide intelligible speech transmittance through the facemask 106. In some examples, the facemask 106 may further include a voice communication system that provides, for example, voice amplification, transmission and/or radio communication functionality. These and other ancillary items that may be mounted on the SCBA 100 will not be discussed herein in detail.

The SCBA 100 further includes a pressure reducer 130 (also generally referred to as a first-stage regulator) fluidly coupled to the high-pressure tank 102 and the regulator 110. The pressure reducer 130 interchangeably referred to hereinafter as "the reducer 130". The reducer 130 may receive the breathable gas from the high-pressure tank 102 at the tank pressure P1 through one or more hoses 124 and may reduce the pressure of the breathable gas from the tank pressure P1 to an intermediate pressure (which may range from, e.g., 85 to 175 psi). The reducer 130 may then deliver the breathable gas at this intermediate pressure to the regulator 110 through one or more hoses 126. Thus, this intermediate pressure at which the breathable gas is delivered through the one or more hoses 126 is typically referred to herein as an "outlet pressure P2". The outlet pressure P2 is lower than the tank pressure P1.

The regulator 110 is configured to admit the breathable gas into the interior region 108 of the facemask 106. Specifically, the regulator 110 may further reduce the pressure of the breathable gas from the outlet pressure P2 to a desired pressure (e.g., to near-atmospheric pressure or to a level suitable for breathing) and deliver the breathable gas into the interior region 108 or the nose cup 122 of the facemask 106. In some embodiments, the regulator 110 may be an "on-demand" regulator that provides airflow in response to inhalations of the user and delivery of the breathing gas may cease upon exhalation. In such an arrangement, the regulator 110 may maintain the breathing gas at a pressure that is slightly above the ambient pressure at all times.

In some examples, the pressure reducer 130 as disclosed herein is detachably attached to the tank holder 128 in a vertical orientation. In some examples, the pressure reducer 130 is detachably attached to the tank holder 128 through one or more suitable attachment mechanisms, for example, mechanical fasteners, adhesives, etc. The reducer 130 includes a body 132. In some examples the body 132 includes a top end 134 and a bottom end 136 opposite to the top end 134. The term "vertical orientation" is defined with respect to the tank holder 128. The term may be defined such that the reducer 130 is in the vertical orientation when a distance between the ground and the top end 134 of the reducer 130 is greater than a distance between the ground and the bottom end 136 of the reducer 130 when the SCBA 100 is donned by the user.

It should be understood that FIG. 1 is a schematic representation of the SCBA 100 and is not to scale. The items illustrated therein are arranged such that various items and relationships may be easily visible. Further, such arrangements may not correspond exactly to those that may be used in actual applications. For example, rather than the reducer 130 being detachably attached to the tank holder 128 and being connected to the high-pressure tank 102 by the one or more hoses 124, in an actual product the reducer 130 may be located at a lower end of the high-pressure tank 102 with the one or more hoses 124 being absent.

Figure 2A:
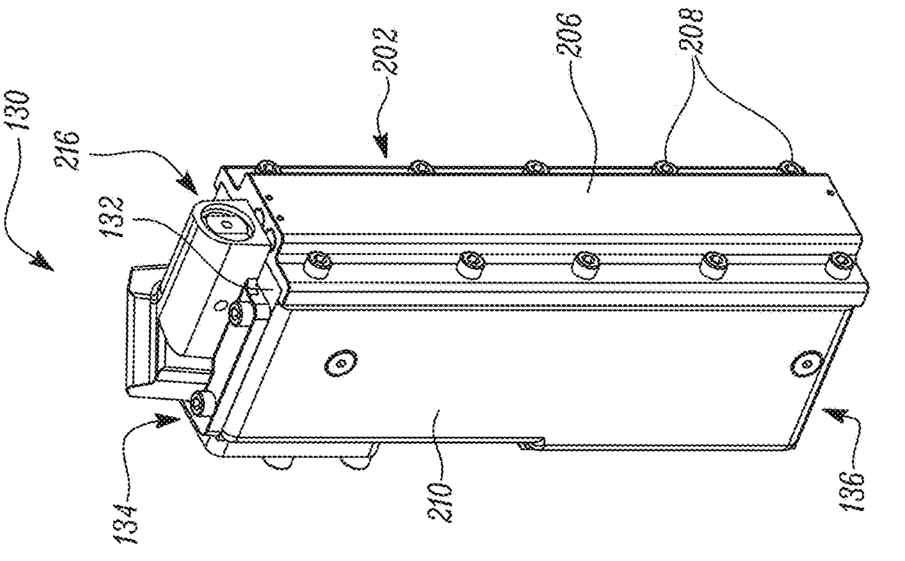
FIGS. 2A-2B illustrate schematic front and rear perspective views, respectively, of an example of a pressure regulator of the SCBA of FIG. 1, in accordance with techniques of this disclosure.
Figure 2B:
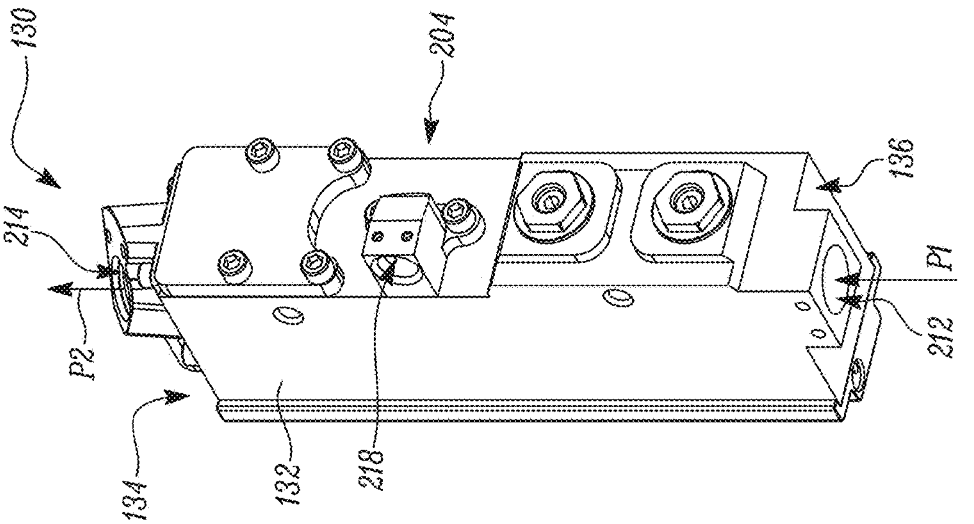
Figure 2C:
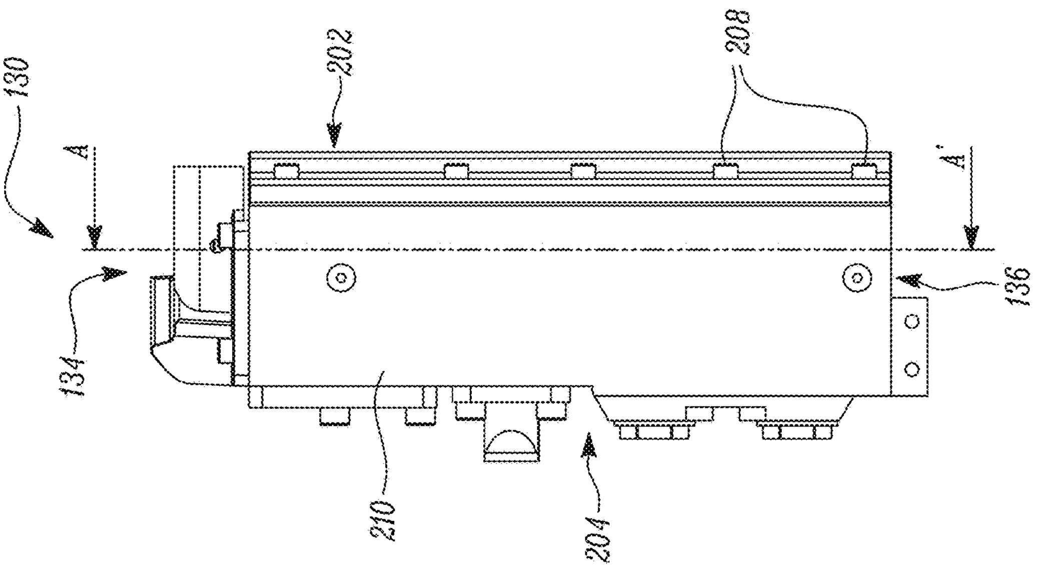
FIG. 2C illustrates a schematic side view of the pressure regulator of FIGS. 2A and 2B, in accordance with techniques of this disclosure.

FIGS. 2A-2C illustrate schematic perspective views of the reducer 130. Specifically, FIG. 2A illustrates a schematic perspective view of a front portion 202 of the reducer 130 and FIG. 2B illustrates a schematic perspective view of a rear portion 204 of the reducer 130. FIG. 2C illustrates a schematic perspective side view of the reducer 130. Referring now to FIGS. 2A-2C, the reducer 130 includes the body 132 having the top end 134 and the bottom end 136 opposite to the top end 134.

In some examples, the reducer 130 further includes a decal or label 206 (shown in FIG. 2A) mounted on the front portion 202 of the reducer 130. The label 206 may be detachably attached to the body 132 of the reducer 130 through one or more fasteners 208. It should be understood that the label 206 may be attached to the body 132 through any suitable means, e.g., snap-fit connection, tongue and grove connection, welding, brazing, adhesives, etc. In some examples, the label 206 may include information such as a serial number or code (e.g., a bar code, an alphanumeric code, symbols, etc.), a part number, a product name, a logo(s), and/or the like.

The reducer 130 further includes a cover 210 (shown in FIG. 2A) removably disposed on the body 132. In some examples, the cover 210 may be provided on one side of the body 132 only, such that in the vertical orientation of the reducer 130, the cover 210 faces away from the tank holder 128 (shown in FIG. 1). In some examples, the cover 210 may protect the body 132 of the reducer 130, e.g., from debris, water, or other environmental factors or elements during normal operation of the reducer 130 or during cleaning of the SCBA 100. In some examples, the cover 210 may also include information, such as, for example, a serial number or code, a part number, a product name, a logo(s) and/or the like.

In some examples, the cover 210 may be made from any suitable material, such as, for example, high temperature polymeric material (or any suitable polymer), metals, alloys, or composite materials. In some examples, the cover 210 may be integrally formed as one-piece using, e.g., an injection molding process. In some examples, the cover 210 may provide a desirable appearance to the body 132 of the reducer 130. For example, the cover 210 may be of black color. Thus, the body 132 of the reducer 130 may not need to be produced in any specific color since the desirable appearance may be provided by the cover 210 which may be produced in a cost-efficient manner as compared to the body 132 of the reducer 130.

Referring now to FIGS. 1 and 2B, in some examples, the reducer 130 further includes an inlet opening 212 (shown in FIG. 2B) for receiving the breathable gas from the high-pressure tank 102. In some examples, the inlet opening 212 may accept the hose 124 connected to the high-pressure tank 102. In some examples, the inlet opening 212 may include a quick-connect configuration (e.g., with a latch assembly, locking pins, and so on) for accepting the hose 124. In the illustrated example of FIG. 2B, the reducer 130 include a single inlet opening 212, however, in some examples, the reducer 130 may include multiple inlet openings 212.

The reducer 130 further includes an outlet opening 214. The reducer 130 delivers the breathable gas at the outlet pressure P2 though the outlet opening 214 to the regulator 110 via the one or more hoses 126. In some examples, the outlet opening 214 may accept the hose 126 that fluidly connects the outlet opening 214 to the regulator 110. In some examples, the reducer 130 may include multiple outlet openings 214 corresponding to the multiple inlet openings 212. In some examples, the reducer 130 further includes a low-pressure relief valve 216 disposed proximal to the top end 134 of the reducer 130 and arranged to limit the outlet pressure P2 from the reducer 130. In some examples, the reducer 130 further includes an opening 218. One or more manual pressure gauges or electronic pressure transducers may be fluidly connected to the reducer 130 through the opening 218.

Figure 3:
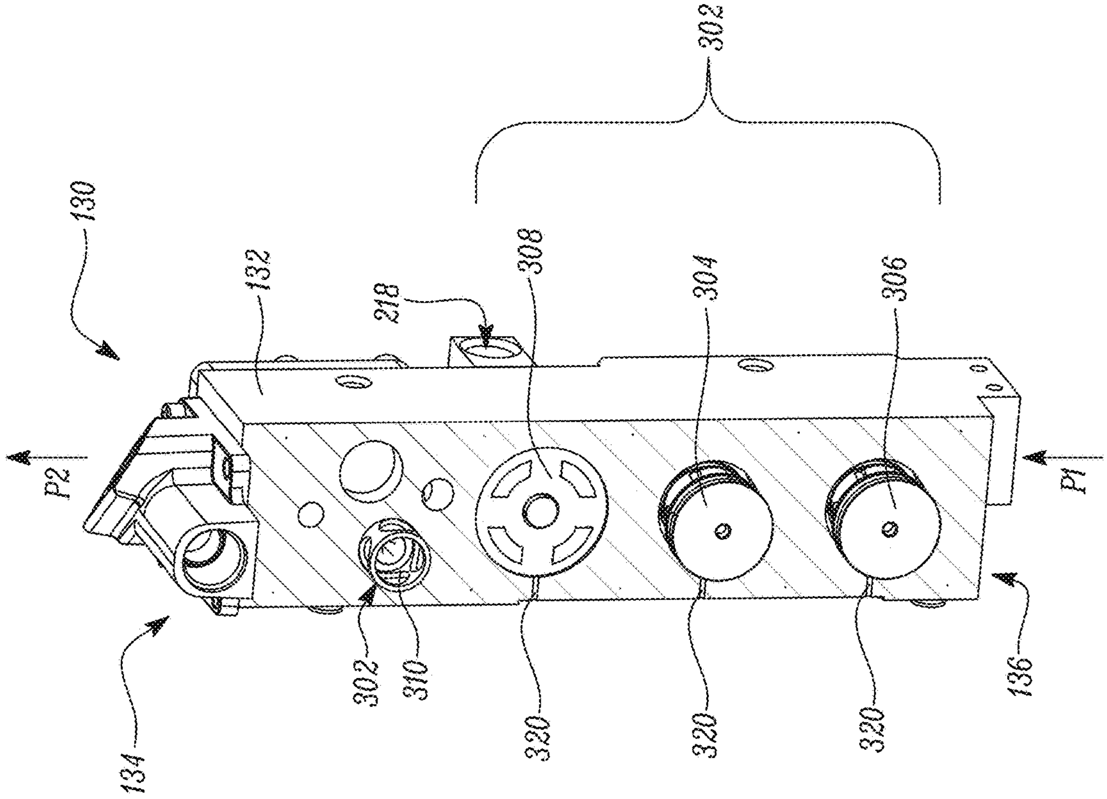
FIG. 3 illustrates a schematic sectional perspective view of the pressure reducer taken along a section line A-A' shown in FIG. 2C, in accordance with techniques of this disclosure.

FIG. 3 illustrates a schematic perspective partial sectional view of the reducer 130 taken along a section line A-A' as shown in FIG. 2C. Referring now to FIGS. 1 and 3, the reducer 130 further includes a valve unit 302 disposed within the body 132 and configured to receive the breathable gas from the high-pressure tank 102 at the tank pressure P1 and to deliver the breathable gas at the outlet pressure P2 lower than the tank pressure P1. Specifically, the reducer 130 is configured to deliver the breathable gas to the regulator 110 at the outlet pressure P2.

In some examples, the reducer 130 further includes a primary pathway (not shown) that is configured to deliver the breathable gas to the regulator 110 through the outlet opening 214 at a first lower pressure. The valve unit 302 includes a first valve 304 (interchangeably referred to as: the valve 304") mounted on the primary pathway and configured to deliver the breathable gas at the first lower pressure. In some examples, the reducer 130 further includes a secondary pathway (not shown) that is configured to deliver the breathable gas to the regulator 110 at a second lower pressure that is higher than the first lower pressure at which the primary pathway would have delivered the breathable gas. The valve unit 302 includes a second valve 306 (interchangeably referred to as: the valve 306") mounted on the secondary pathway and configured to deliver the breathable gas at the second lower pressure. In some examples, the valve unit 302 further includes other valves, such as valves 308, 310.

In some examples, the secondary air pathway is independent of the first pathway (although they may both deliver the breathable gas to the common outlet opening 214, and may share one or more air passages in common), such that breathable gas may be supplied through the secondary pathway rather than through the primary pathway when desired. In some examples, the reducer 130 may be configured to switch from the primary pathway to the secondary pathway based on operation of a valve when the tank pressure P1 falls below a predetermined threshold.

In some examples, the reducer 130 may further include an outlet (not shown) configured as an Emergency Breathing Support System (EBSS) outlet. In some examples, the outlet may be fluidly connected to the secondary pathway of the reducer 130. The outlet may be used as part of the EBSS of the SCBA 100 (shown in FIG. 1). Specifically, a supply hose of the EBSS may be connected to the outlet.

Ordinary artisans may be aware that the EBSS is a system whereby a first SCBA (referred to herein as a "donor" SCBA) may provide breathable air to a second SCBA (referred to herein as a "recipient" SCBA). It should be understood that such an arrangement may only be used in an emergency and may only be used for a short duration of time. For example, the EBSS may be helpful where the recipient SCBA is out of breathable air and the user of that recipient SCBA may not be able to immediately get to a location with breathable ambient air.

In the illustrated example of FIG. 3, the first valve 304, the second valve 306, and the valve 308 may be coupled to a plurality of vent holes 320 disposed on the body 132 of the reducer 130. Specifically, the plurality of vent holes 320 is disposed on an outer surface 402 (also shown in FIG. 4) of the body 132. The plurality of vent holes 320 is schematically shown to be fluidly connected to the corresponding valves 304, 306, 308. Therefore, each of the valves 304, 306, 308 is provided with a corresponding one vent hole 320. In some examples, one or more of the valves 304, 306, 308 may be fluidly coupled to multiple vent holes 320.

In some examples, the plurality of vent holes 320 may fluidly connect the first valve 304, the second valve 306, and the valve 308 to the ambient for pressure compensation. The plurality of vent holes 320 is configured to vent a gas (e.g., the breathable gas or any other gas or a mixture of gases) from an interior of the body 132. In the illustrated example of FIG. 3, the plurality of vent holes 320 is configured to vent the gas from the first valve 304, the second valve 306, and the valve 308. In some examples, the gas may be breathable gas leaked from one or more seals (not shown) within the valves 304, 306, 308. It should be understood that the plurality of vent holes 320 may also be provided corresponding to other components of the reducer 130.

Figure 4:
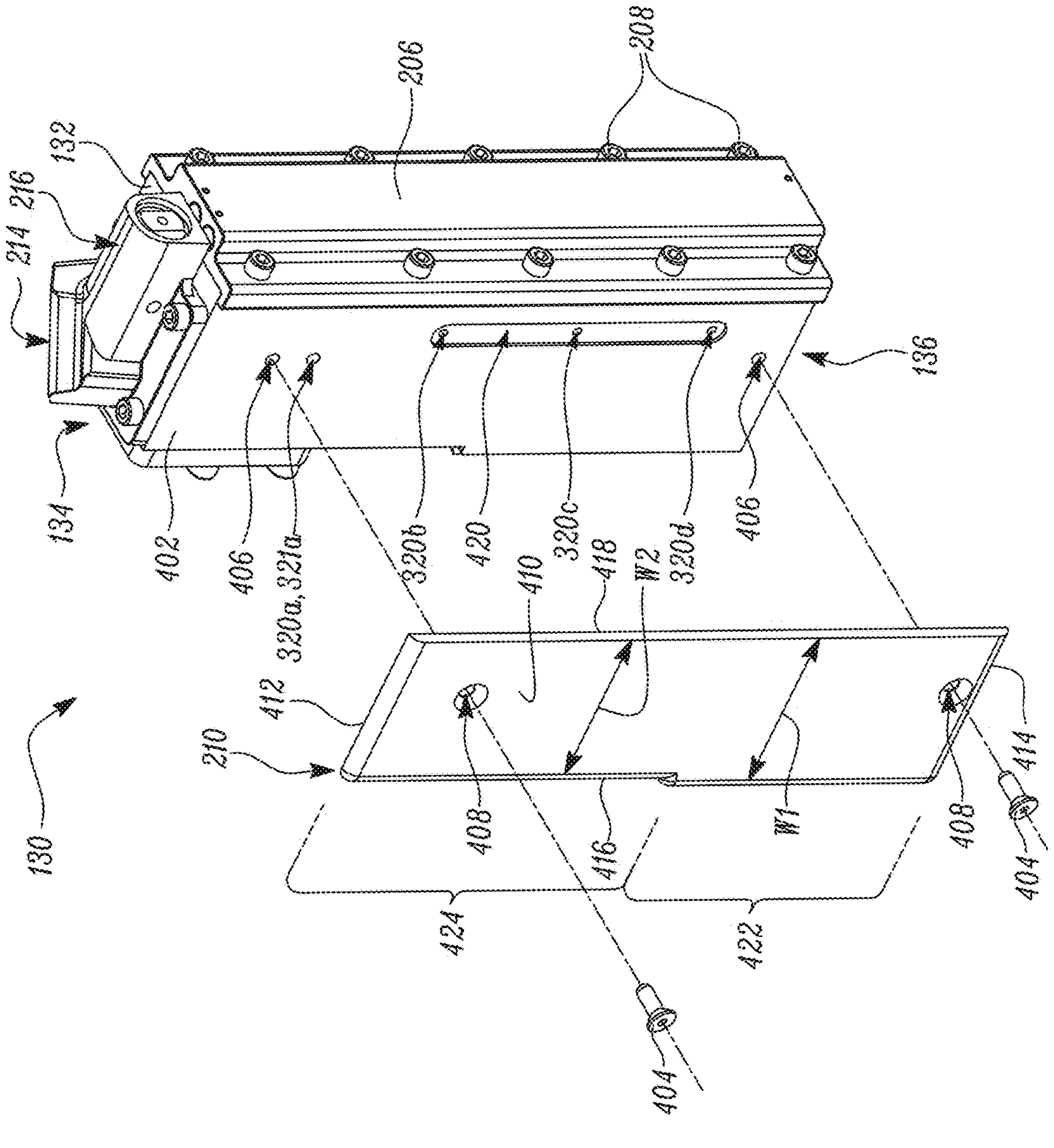
FIG. 4 is a schematic exploded front perspective view of the pressure reducer of FIGS. 2A and 2B illustrating a body of the pressure reducer and a cover, in accordance with techniques of this disclosure.

FIG. 4 is a schematic exploded perspective view of the reducer 130 illustrating the body 132 of the reducer 130 and the cover 210. The body 132 includes the outer surface 402. The cover 210 is removably disposed on the outer surface 402 of the body 132. In some examples, the reducer 130 further includes a plurality of mechanical fasteners 404 configured to removably couple the cover 210 to the body 132. In the illustrated example of FIG. 4, the cover 210 is removably coupled to the body 132 through a pair of mechanical fasteners 404, however, the plurality of mechanical fasteners 404 may include any number of mechanical fasteners 404.

In some examples, the body 132 further includes a plurality of fastener openings 406 extending from the outer surface 402. In the illustrated example of FIG. 4, the body 132 includes a couple of fastener openings 406 corresponding to the pair of mechanical fasteners 404, however, the plurality of fastener openings 406 may include any number of fastener openings 406 based on the number of the mechanical fasteners 404. In some examples, the cover 210 further includes a plurality of cover openings 408 extending therethrough and aligned with corresponding fastener openings 406 from the plurality of fastener openings 406 of the body 132. In some examples, each of the plurality of mechanical fasteners 404 is at least partially received through a corresponding cover opening 408 from the plurality of cover openings 408 and received within the corresponding fastener opening 406.

It should be understood that the attachment mechanism of the cover 210 with the outer surface 402 of the body 132 as illustrated in FIG. 4 is exemplary in nature, and any suitable attachment mechanism may be utilized for removably attaching the cover 210 to the body 132 or the outer surface 402. For example, the cover 210 may be removably attached to the body 132 by a snap-fit mechanism, one or more projections and corresponding channels, hook and loop fasteners, and so forth.

The pressure reducer 130 further includes the plurality of vent holes 320 extending from the outer surface 402 of the body 132. The plurality of vent holes 320 is configured to vent the gas from an interior of the body 132, e.g., from the valve unit 302 (or other components of the reducer 130) shown in FIG. 3. In some examples, the plurality of vent holes 320 is spaced apart from each other on the outer surface 402 between the top end 134 and the bottom end 136 of the body 132. The cover 210 encloses the plurality of vent holes 320. Thus, the cover 210 may protect the plurality of vent holes 320 from environmental factors or elements, such as debris, water, etc. and may prevent such environmental factors or elements from clogging the plurality of vent holes 320.

In some examples, the outer surface 402 of the body 132 is disposed opposite to and spaced apart from the tank holder 128 (shown in FIG. 1). This may allow a service technician to easily access the outer surface 402 of the body 132 by removing the cover 210 to check for any possible leakage through the plurality of vent holes 320. This may help in diagnosing any issue related to the operation of the reducer 130. Further, since the cover 210 is removably disposed on the outer surface 402, the plurality of vent holes 320 may not need to be sandwiched between other parts of the SCBA 100 (shown in FIG. 1) for protection which may otherwise have led to difficulty in accessing the plurality of vent holes 320 for inspection.

In some examples, the cover 210 includes a top edge 412 disposed proximal to the top end 134 of the body 132, a bottom edge 414 opposite to the top edge 412 and disposed proximal to the bottom end 136 of the body 132, a first lateral edge 416 extending from the top edge 412 to the bottom edge 414, and a second lateral edge 418 extending from the top edge 412 to the bottom edge 414 and opposite to the first lateral edge 416. In the illustrated embodiment of FIG. 4, the cover 210 has a substantially rectangular shape with one or more beveled or chamfered edges. However, a shape and dimensions of the cover 210 may depend upon various factors, for example, but not limited to, the shape and dimensions of the outer surface 402 of the body 132, location of the vent holes 320, and so forth.

In some examples, the body 132 further includes a recess 420 disposed on the outer surface 402. At least one vent hole 320 from the plurality of vent holes 320 is disposed in the recess 420. In the illustrated example of FIG. 4, the plurality of vent holes 320 includes four vent holes 320*a*, 320*b*, 320*c*, 320*d*. The vent holes 320*b*, 320*c*, 320*d* are disposed in the recess 420 and the vent hole 320*a* is disposed outside the recess 420. In some examples, the vent holes 320*b*, 320*c*, 320*d* are fluidly connected to the respective valves 308, 304, 306 (shown in FIG. 3) and the vent hole 320*a* is fluidly connected to the valve 310 (shown in FIG. 3). It should be understood that the relative position and arrangement of the plurality of vent holes 320 as illustrated in FIG. 4 is exemplary in nature and may vary based on application requirements.

In some examples, the cover 210 further includes a wide portion 422 disposed between the top edge 412 and the bottom edge 414. The wide portion 422 has a width W1 greater than a width W2 of a rest of the cover 424.

Figure 5:
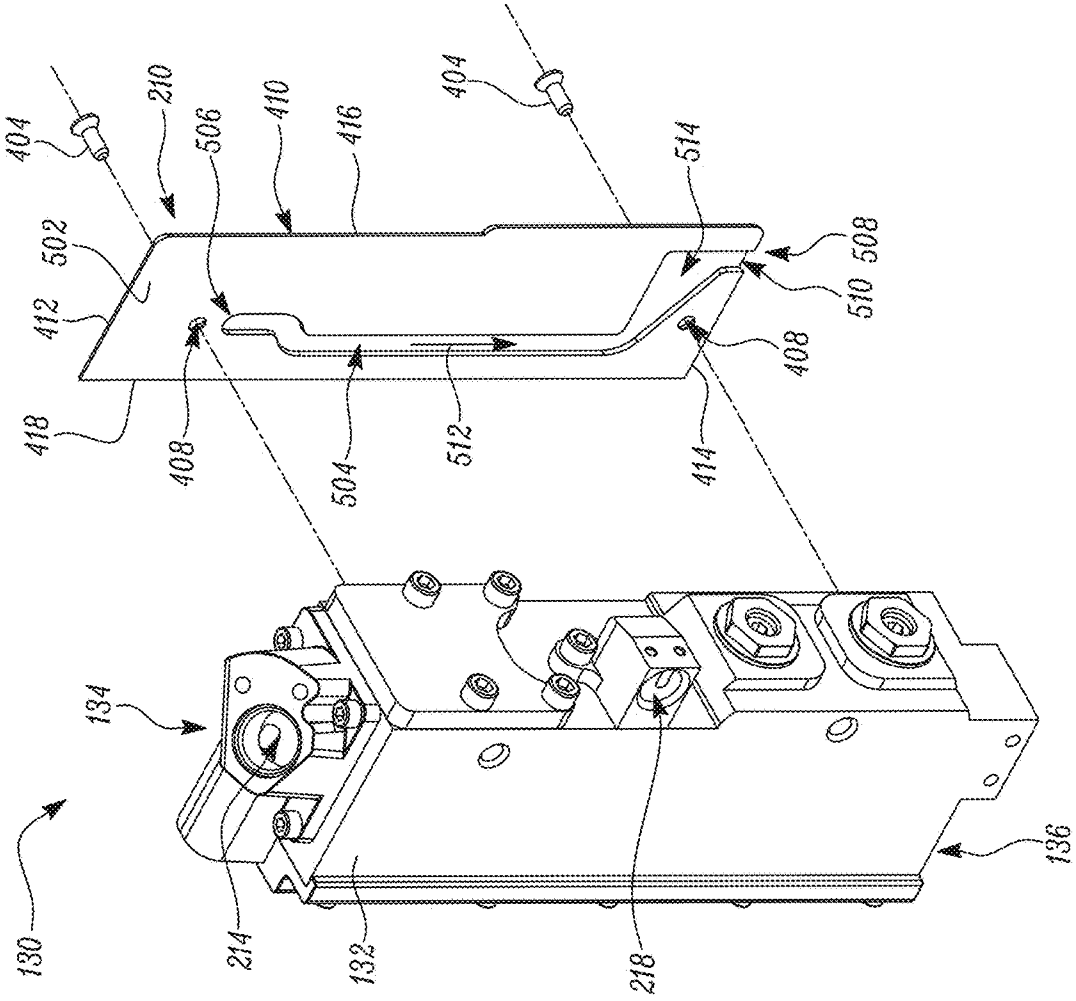
FIG. 5 is a schematic exploded rear perspective view of the pressure reducer of FIGS. 2A and 2B illustrating the body of the pressure reducer and the cover, in accordance with techniques of this disclosure.

FIG. 5 is a schematic exploded perspective view of the reducer 130 illustrating the body 132 of the reducer 130 and the cover 210. Referring now to FIGS. 4 and 5, in some examples, the cover 210 includes an internal surface 502 at least partially engaging with the outer surface 402 of the body 132 and an external surface 410 opposing the internal surface 502.

The cover 210 includes a fluid passage 504 disposed in fluid communication with the plurality of vent holes 320. In some examples, the fluid passage is a recessed channel disposed on the internal surface 502 of the cover 210 and aligned with the plurality of vent holes 320. The fluid passage 504 may have any suitable cross-sectional shape, such as C-shaped, U-shaped, and so forth. In some examples, the fluid passage 504 is at least partially aligned with the recess 420. The fluid passage 504 is configured to receive the gas from the plurality of vent holes 320 and discharge the gas externally of the cover 210. Specifically, the fluid passage 504 is configured to receive the gas from any of the vent holes 320*a*-320*d* from the plurality of vent holes 320 and discharge the gas externally of the cover 210. In some examples, the fluid passage 504 may be integrally molded with the cover 210.

In some examples, the fluid passage 504 extends between a closed passage end 506 disposed proximal to the top edge 412 and an open passage end 508 disposed at the bottom edge 414 of the cover 210. The closed passage end 506 may be rounded. The open passage end 508 forms a cover vent opening 510 configured to discharge the gas externally of the cover 210. Thus, the fluid passage 504 in fluid communication with the plurality of vent holes 320 may receive the gas from any of the vent holes 320*a*-320*d* from the plurality of vent holes 320 and discharge the gas externally of the cover 210 as the gas travels through the fluid passage 504 as shown by an arrow 512 towards the open passage end 508 and the cover vent opening 510. Since the fluid passage 504 is closed at the closed passage end 506, the gas may be restricted to move towards the cover vent opening 510 only. In some examples, the fluid passage 504 includes a chamber 514 disposed proximal to the open passage end 508. In some examples, the chamber 514 has a substantially trapezoidal shape.

The cover vent opening 510 is disposed at the bottom edge 414 of the cover 210. This may restrict ingress of environmental factors or elements, such as debris or water, through the cover vent opening 510 since the reducer 130 may generally be in the vertical orientation as described above during normal operation of the SCBA 100 (shown in FIG. 1) or during cleaning of the SCBA 100. The chamber 514 may further restrict the movement of the environmental factors or elements, such as debris, water, etc., towards the plurality of vent holes 320 due to the geometric shape and position of the chamber 514.

Figure 6:
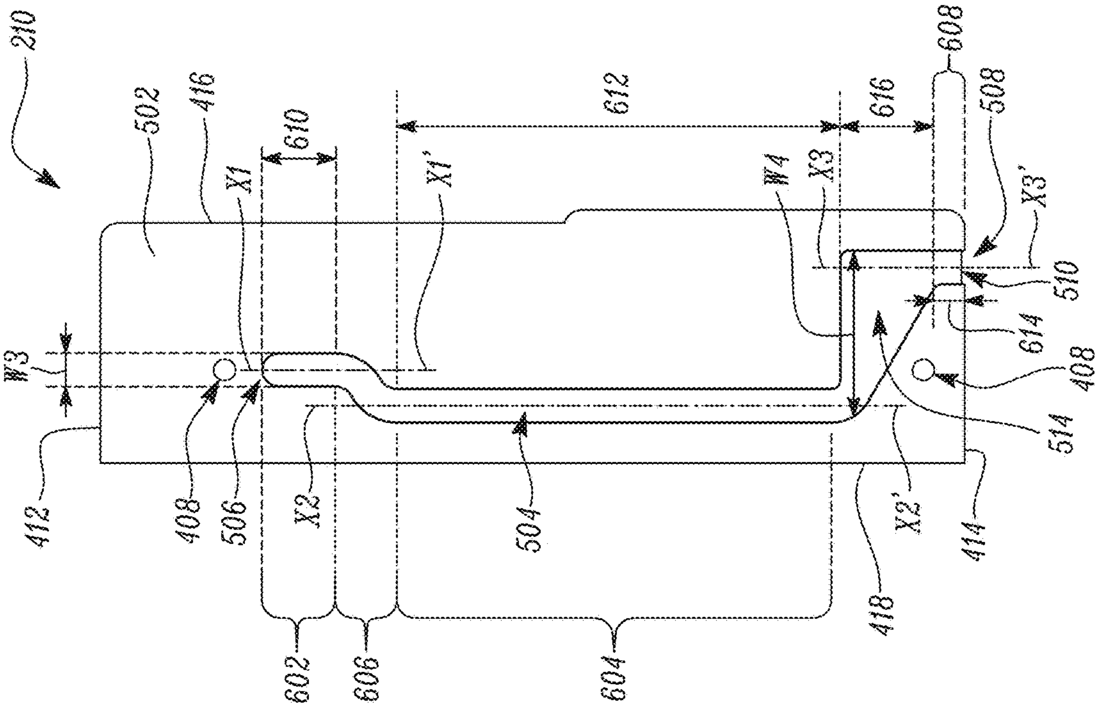
FIG. 6 illustrates a schematic top view of an internal surface of the cover of the pressure reducer, in accordance with techniques of this disclosure.

FIG. 6 illustrates a schematic top view of the cover 210. Specifically, FIG. 6 illustrates a schematic top view of the internal surface 502 of the cover 210. Referring now to FIGS. 4-6, in some examples, the fluid passage 504 further includes a first portion 602 extending along a first axis X1-X1' and aligned with a top vent hole 321*a* from the plurality of vent holes 320. The top vent hole 321*a* corresponds to the vent hole 320*a* that is disposed outside of the recess 420. The first portion 602 includes the closed passage end 506. In some examples, the first portion 602 may receive the gas vented from the top vent hole 321*a*. The gas may then move along the fluid passage 504 towards the open passage end 508.

In some examples, the fluid passage 504 further includes a second portion 604 extending along a second axis X2-X2' parallel to and offset from the first axis X1-X1' and aligned with a rest of the plurality of vent holes 320*b*-320*d* apart from the top vent hole 321*a*. In some examples, the second portion 604 may receive the gas vented from the rest of the plurality of vent holes 320*b*-320*d*. The gas may then move along the fluid passage 504 towards the open passage end 508.

In some examples, the fluid passage 504 further includes an intermediate portion 606 disposed between the first and second portions 602, 604 and inclined to each of the first and second axes X1-X1', X2-X2'. The intermediate portion 606 may fluidly connect the first and second portions 602, 604 such that the gas vented through the top vent hole 321*a* may be received by the second portion 604. It should be understood that the cover 210 may be disposed on the outer surface 402 such that all the gas vented from the plurality of vent holes 320 may be received in the fluid passage 504.

In some examples, the fluid passage 504 further includes a third portion 608 extending along a third axis X3-X3' parallel to and offset from each of the first and second axes X1-X1', X2-X2'. The third portion 608 includes the open passage end 508. In some examples, the chamber 514 is disposed between the second and third portions 604, 608. The chamber 514 is located between the second and third portions 604, 608 such that the chamber 514 may restrict the environmental factors or elements, such as debris, moisture, etc. from reaching the second portion 604 if entered from the open passage end 508. Due to the vertical orientation of the pressure reducer 130, any external contaminant entering the fluid passage 504 from the open passage end 508 may be trapped inside the chamber 514 and discharged from the fluid passage 504, via the cover vent opening 510, due to gravity.

In some examples, the first, second and third portions 602, 604, 608 have first, second and third lengths 610, 612, 614 along the first, second and third axis X1-X1', X2-X2', X3-X3', respectively. In some examples, the second length 612 of the second portion 604 along the second axis X2-X2' is greater than the first length 610 of the first portion 602 along the first axis X1-X1' by a factor of at least 5. In some examples, the second length 612 of the second portion 604 is greater than the third length 614 of the third portion 608 along the third axis X3-X3' by a factor of at least 10. In some examples, the second length 612 of the second portion 604 is greater than a maximum chamber length 616 of the chamber 514 parallel to the second axis X2-X2' by a factor of at least 3.

In some examples, each of the first, second, and third portions 602, 604, 608 has a uniform width W3. In some examples, the chamber 514 has a maximum chamber width W4 greater than the width W3 of a rest of the fluid passage 504. In some examples, the maximum chamber width W4 of the chamber 514 is greater than the uniform width W3 by a factor of at least 4. It should be understood that the relative size, geometry and dimensions of the first portion 602, the second portion 604, the third portion 608, the intermediate portion 606, and the chamber 514 as illustrated in FIGS. 4-6 are exemplary in nature and may vary based on application requirements.

It should be noted that the exemplary reducer 130 and cover 210, as shown in FIGS. 2-6, is an idealized, generic representation. It should further be noted that FIGS. 2-6 are schematics, arranged so as to most easily depict various components of a three-dimensional reducer in a two-dimensional drawing, and are not necessarily indicative of the exact manner in which the associated components may be arranged or configured in an actual product.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A pressure reducer for a self-contained breathing apparatus (SCBA), the pressure reducer comprising:

a body comprising an outer surface, a top end, and a bottom end opposite to the top end;

a valve unit disposed within the body and configured to receive a breathable gas from a high-pressure tank at a tank pressure and to deliver the breathable gas at an outlet pressure lower than the tank pressure;

a plurality of vent holes extending from the outer surface of the body, the plurality of vent holes configured to vent a gas from an interior of the body, wherein the plurality of vent holes is spaced apart from each other on the outer surface between the top end and the bottom end of the body;

a cover comprising a top edge disposed proximal to the top end of the body, a bottom edge opposite to the top edge and disposed proximal to the bottom end of the body, a first lateral edge extending from the top edge to the bottom edge, and a second lateral edge extending from the top edge to the bottom edge and opposite to the first lateral edge, the cover being removably disposed on the outer surface and enclosing the plurality of vent holes, the cover comprising a fluid passage disposed in fluid communication with the plurality of vent holes, wherein the fluid passage is configured to receive the gas from the plurality of vent holes and discharge the gas externally of the cover; and wherein the fluid passage extends between a closed passage end disposed proximal to the top edge and an open passage end disposed at the bottom edge of the cover, and wherein the open passage end forms a cover vent opening configured to discharge the gas externally of the cover.

2. The pressure reducer of a claim 1, wherein the cover further comprises a wide portion disposed between the top edge and the bottom edge, and wherein the wide portion has a width greater than a width of a rest of the cover.

3. The pressure reducer of claim 1, wherein the fluid passage comprises a chamber disposed proximal to the open passage end, and wherein the chamber has a maximum chamber width greater than a width of a rest of the fluid passage.

4. The pressure reducer of claim 1, wherein the body further comprises a recess disposed on the outer surface, wherein at least one vent hole from the plurality of vent holes is disposed in the recess, and wherein the fluid passage is at least partially aligned with the recess.

5. The pressure reducer of claim 1, wherein the cover further comprises an internal surface at least partially engaging with the outer surface of the body and an external surface opposing the internal surface, and wherein the fluid passage is a recessed channel disposed on the internal surface of the cover and aligned with the plurality of vent holes.

6. The pressure reducer of claim 1, further comprising a plurality of mechanical fasteners configured to removably couple the cover to the body.

7. The pressure reducer of claim 6, wherein the body further comprises a plurality of fastener openings extending from the outer surface, wherein the cover further comprises a plurality of cover openings extending therethrough and aligned with corresponding fastener openings from the plurality of fastener openings of the body, and wherein each of the plurality of mechanical fasteners is at least partially received through a corresponding cover opening from the plurality of cover openings and received within the corresponding fastener opening.

8. A self-contained breathing apparatus (SCBA) comprising:

a high-pressure tank configured to store a breathable gas at a tank pressure and a tank holder configured to detachably receive the high-pressure tank;

a facemask configured to be worn by a user, the facemask defining an interior region adjacent the user's face when the facemask is donned by the user;

a regulator mounted on the facemask; and a pressure reducer fluidly coupled to the high-pressure tank and the regulator, wherein the pressure reducer is detachably attached to the tank holder in a vertical orientation, the pressure reducer comprising:

a body comprising an outer surface, a top end and a bottom end opposite to the top end, and wherein the outer surface of the body is disposed opposite to and spaced apart from the tank holder;

a valve unit disposed within the body and configured to receive the breathable gas from the high-pressure tank at the tank pressure and to deliver the breathable gas to the regulator at an outlet pressure lower than the tank pressure, wherein the regulator is configured to admit the breathable gas into the interior region of the facemask;

a plurality of vent holes extending from the outer surface of the body, the plurality of vent holes configured to vent a gas from an interior of the body, wherein the plurality of vent holes is spaced apart from each other on the outer surface between the top end and the bottom end of the body;

a cover removably disposed on the outer surface and enclosing the plurality of vent holes, the cover comprising a fluid passage disposed in fluid communication with the plurality of vent holes, wherein the fluid passage is configured to receive the gas from the plurality of vent holes and discharge the gas externally of the cover, wherein the cover further comprises a top edge disposed proximal to the top end of the body, a bottom edge opposite to the top edge and disposed proximal to the bottom end of the body, a first lateral edge extending from the top edge to the bottom edge, and a second lateral edge extending from the top edge to the bottom edge and opposite to the first lateral edge; and wherein the fluid passage extends between a closed passage end disposed proximal to the top edge and an open passage end disposed at the bottom edge of the cover, and wherein the open passage end forms a cover vent opening configured to discharge the gas externally of the cover.

9. The SCBA of claim 8, wherein the cover further comprises a wide portion disposed between the top edge and the bottom edge, and wherein the wide portion has a width greater than a width of a rest of the cover.

10. The SCBA of claim 8, wherein the fluid passage comprises a chamber disposed proximal to the open passage end, and wherein the chamber has a maximum chamber width greater than a width of a rest of the fluid passage.

11. The SCBA of claim 8, wherein the body further comprises a recess disposed on the outer surface, wherein at least one vent hole from the plurality of vent holes is disposed in the recess, and wherein the fluid passage is at least partially aligned with the recess.

12. The SCBA of claim 8, wherein the cover further comprises an internal surface at least partially engaging with the outer surface of the body and an external surface opposing the internal surface, and wherein the fluid passage is a recessed channel disposed on the internal surface of the cover and aligned with the plurality of vent holes.

13. The SCBA of claim 8, further comprising a plurality of mechanical fasteners configured to removably couple the cover to the body.

14. The SCBA of claim 13, wherein the body further comprises a plurality of fastener openings extending from the outer surface, wherein the cover further comprises a plurality of cover openings extending therethrough and aligned with corresponding fastener openings from the plurality of fastener openings of the body, and wherein each of the plurality of mechanical fasteners is at least partially received through a corresponding cover opening from the plurality of cover openings and received within the corresponding fastener opening.

* * * * *